United States Patent
Masoomzadeh et al.

(10) Patent No.: US 12,395,917 B1
(45) Date of Patent: Aug. 19, 2025

(54) SYSTEM FOR MOBILE USER TERMINAL TRIGGERED HANDOVER

(71) Applicant: AMAZON TECHNOLOGIES, INC., Seattle, WA (US)

(72) Inventors: Ali Masoomzadeh, Marlboro, NJ (US); Jyotirmoy Banik, Chula Vista, CA (US); Deepak, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 392 days.

(21) Appl. No.: 18/160,777

(22) Filed: Jan. 27, 2023

(51) Int. Cl.
*H04W 36/32* (2009.01)
*H04B 7/185* (2006.01)
*H04W 36/36* (2009.01)

(52) U.S. Cl.
CPC ...... *H04W 36/324* (2023.05); *H04B 7/18513* (2013.01); *H04W 36/362* (2023.05)

(58) Field of Classification Search
CPC .............. H04W 36/324; H04W 36/362; H04B 7/18513
See application file for complete search history.

(56) References Cited

U.S. PATENT DOCUMENTS

2022/0240139 A1 * 7/2022 Park ..................... H04W 36/362

* cited by examiner

Primary Examiner — Curtis B Odom
(74) Attorney, Agent, or Firm — Lindauer Law, PLLC

(57) ABSTRACT

A constellation of satellites provides communication services to user terminals (UTs). Some UTs may be mobile. Each satellite provides communication services to discrete geographic areas or "spots" on and above the Earth. The mobile UT determines it will be moving from a current spot to a destination spot based on one or more of geographic position and the geometry of the spots, or signal strength of received signals from one or more satellites associated with the destination spot. The mobile UT sends a handover request. Responsive to the handover request, communication resources associated with a handover time and the destination spot are allocated to the mobile UT. This information is provided to the mobile UT for use after the handover time. During this process, the exact position of the mobile UT remains unknown to the satellites and associated systems managing the constellation and handover.

20 Claims, 7 Drawing Sheets

HANDOVER REQUEST 192

| PARAMETER 502 | VALUE 504 |
|---|---|
| UT IDENTIFIER | 1 |
| PRIMARY DESTINATION SPOT ID | 3 |
| DISTANCE TO CURRENT SPOT CENTER | 12.1 |
| DISTANCE TO DESTINATION SPOT CENTER | 8.3 |
| DESTINATION SPOT RANK | 1 |
| SECONDARY DESTINATION SPOT ID | 4 |
| DISTANCE TO SECONDARY DESTINATION SPOT CENTER | 14.1 |
| SECONDARY DESTINATION SPOT RANK | 2 |
| CURRENT SPOT RECEIVED SIGNAL STRENGTH (RSS) | 127 |
| PRIMARY DESTINATION SPOT RSS | 173 |
| PRIMARY DESTINATION SPOT RSS RANK | 1 |
| SECONDARY DESTINATION SPOT RSS | 113 |
| ... | ... |

HANDOVER DATA 164

| PARAMETER 542 | VALUE 544 |
|---|---|
| UT IDENTIFIER | 1 |
| HANDOVER TIME | 2210 |
| NEXT SAT ID | 11231 |
| NEXT SPOT ID | 3 |
| SUBBEAM | 7 |
| RANDOM ACCESS CHANNEL | 13 |
| SPOT CRYPTOGRAPHIC KEY | {PUB_KEY} |
| SPOT BROADCAST | 27 |
| ... | ... |

GRANT DATA 194

| PARAMETER 562 | VALUE 564 |
|---|---|
| UT IDENTIFIER | 1 |
| TEMPORARY UT ID | 71 |
| SAT ID | 11231 |
| NEXT HANDOVER TIME | 2230 |
| SYNCHRONIZATION DATA | 11 |
| SUBBEAM ID | 7 |
| UL/DL FREQUENCIES | 15.250 / 45.105 |
| TIMESLOT | 5 |
| GRANT EXPIRATION TIME | 2830 |
| ... | ... |

FIG. 5

SYSTEM FOR MOBILE USER TERMINAL TRIGGERED HANDOVER

BACKGROUND

A constellation of satellites may provide communication services to many user terminals. Some user terminals may be mobile.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 5 illustrates a handover request, handover data, and grant data, according to some implementations.

Figure 1:
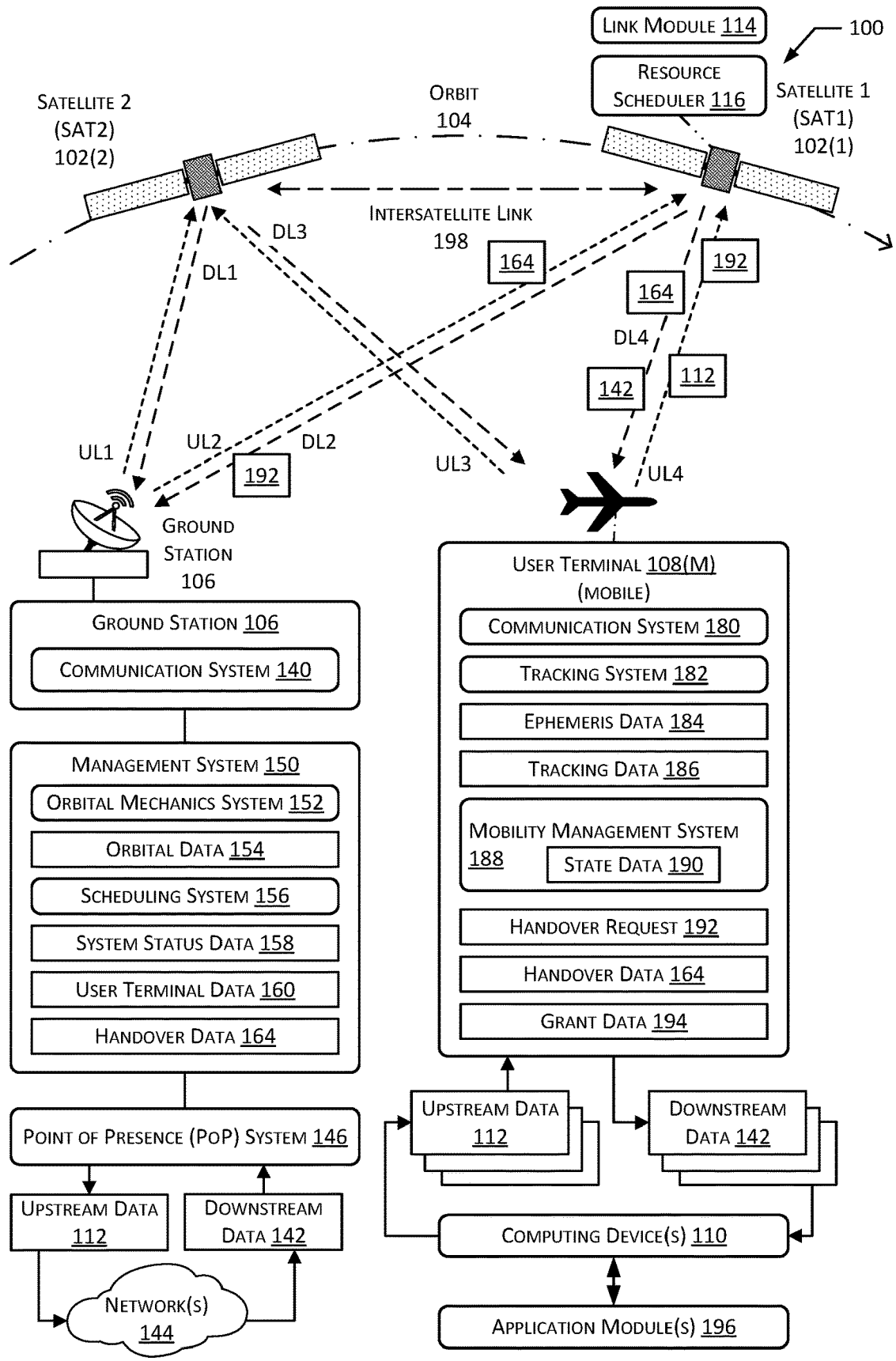
FIG. 1 illustrates a satellite system to support a mobile user terminal (UT) triggered handover from one spot to another, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize a constellation of satellites to wirelessly transfer data between user terminals (UTs) and ground stations that in turn connect to other networks, such as the Internet. Some of these user terminals may remain stationary during operation, while others are mobile user terminals that change their position over time while maintaining communication with the constellation.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, time-sensitive communication activities such as remote control of devices, industrial reporting and control, gaming, and so forth may be adversely affected by these latencies. In comparison, a hop involving a non-geosynchronous orbit (NGO) satellite at an altitude of 600 km only introduces about 4 ms of latency comprising 2 ms up to the satellite and 2 ms down to the UT. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances compared to communication using geosynchronous satellites. This allows for relatively smaller and less expensive satellites to be used.

The Earth may be divided into "spots". Each spot may be represented by one or more of a specific geographic area or may be associated with parameters of communication resources that are allocated to provide communication in a "signal footprint" that is within and near those specific geographic areas. The geographic areas may be tessellated and non-overlapping. For example, the surface of the Earth may be divided into hexagonal cells.

In comparison the geographic area associated with the respective communication resources may differ from the boundaries of those geographic areas. For example, given the parameters of communication resources such as antenna gain, frequency, transmit power levels, co-channel interference, antenna position, antenna direction, and so forth, signal coverage or a "signal footprint" on the Earth may extend beyond the edges of the respective geographic area. In another example, terrain such as high mountains may "shadow" or block coverage and reduce signal coverage to within the edges of the respective geographic area.

Given the relatively short distances and gain provided by antennas on NGO satellites, the overall size of these spots may be relatively small. For example, a spot provided by a geosynchronous satellite may include an area that is thousands of miles on a side. In comparison, a spot provided by an NGO satellite may be tens of kilometers on a side.

To maximize the utilization of the communication resources with a satellite, a UT may report current position data indicative of where the UT is located. The current position data may be determined by a navigation system. In one implementation the navigation system may comprise a global navigation satellite system (GNSS) such as the Global Positioning System (GPS) that provides current position data that is accurate to within a few meters or less. Based on this information the UT may be allocated communication resources to send upstream data on an uplink to the satellite and communication resources for sending downstream data to the UT.

While operating in a normal mode a mobile UT (MUT) provides precision current position data to at least a portion of the communication system, such as to a satellite. Based on the current position data, a resource scheduler allocates communication resources associated with access to a downlink and uplink in a single spot that the MUT is currently within. As the MUT approaches a border with another spot, handover data is generated based on the current position data and sent to the resource scheduler. Based on the current position data, speed, direction, and other information, handover data may be generated and provided to the MUT, allowing a seamless transfer of communication services while the MUT moves from one spot to another while minimizing overallocation of resources that would reduce overall system efficiency.

In some circumstances it is advisable for the MUT to not report current position data. For example, an uncrewed aerial vehicle or other asset may include an MUT to provide communication service. The operator of the vehicle may choose to not provide precise current position data about the vehicle to the communication system.

Described in this disclosure are systems and techniques to provide a self-triggered handover mode to an MUT that avoids the MUT sending information about the precise position of the MUT while still facilitating handovers of communication services from one spot to another. During operation in the self-triggered handover mode, the MUT determines state data such as current position, heading, velocity, distance to adjacent spots, received signal strength (RSS) for signals associated with spots, and so forth. If the MUT determines that it has moved from a first spot to a second spot, or predicts it will move to the second spot, a handover request is sent. The handover request omits geolocation-specific information, such as the current or predicted position of the MUT, avoiding disclosure of its specific position. In response to the handover request, other portions of the system determine handover data. The handover data is then sent to the MUT which utilizes the handover data to perform a handover from the first spot to the second spot at a specified handover time. The other portions of the system, such as one or more satellites associated with the handover, may also be operated based on the handover data. For example, a satellite that will provide service to the MUT after the handover may allocate communication resources such as timeslots, particular frequencies, and so forth for use by the MUT.

By using the system and techniques described in this disclosure, disclosure of precision information about the whereabouts of an MUT is prevented while the ability to seamlessly handover communication service from one spot to another is maintained. As a result, operational security of the MUT may be substantially improved.

Illustrative System

The ability to communicate between two or more locations that are physically separated provides substantial benefits. Communications over areas ranging from counties, states, continents, oceans, and the entire planet are used to enable a variety of activities including remote sensing, remote operation of devices, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites is limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies. As a result, the "footprint" of a radio signal emitted from a geosynchronous satellite may cover a very large area of the Earth. For example, a relatively narrow beam from a geosynchronous satellite's antennas may cover several thousands of square kilometers of the Earth.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms). This latency can be unacceptable in situations where the data is time sensitive, such as for remote control of equipment or to provide near-realtime tracking data.

To alleviate these and other issues, satellites in NGOs may be used. The altitude of an NGO is high enough to provide an individual satellite with a coverage of a relatively large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. As a result, the portion of the Earth that is covered by a signal transmitted from the satellite in the NGO, or "footprint", may be much smaller than that of a geosynchronous satellite. For example, a footprint of a signal transmitted by the antenna array of an NGO satellite may be tens of kilometers or smaller on a side, compared to the thousands of kilometers of a spot of an antenna array onboard a geosynchronous satellite. This allows the satellite in NGO as well as the device communicating with the satellite to use a less powerful transmitter, use smaller antennas, and so forth.

The system 100 shown here comprises a plurality (or "constellation") of communication satellites 102(1), 102(2), . . . , 102(S), each communication satellite 102 being in orbit 104. Also shown is a ground station 106, user terminals (UTs) 108, and computing devices 110. Each computing device 110 may execute one or more application modules 196. For example, the application modules 196 may comprise email applications, telephony applications, videoconferencing applications, telemetry applications, remote sensing applications, telecontrol applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104.

Each satellite 102 may include a link module 114 and resource scheduler 116. The link module 114 is used to establish communication with other devices. The link module 114 may include one or more processors, transmitters, receivers, antennas, digital signal processors, and so forth. The resource scheduler 116 may comprise one or more processors executing instructions to manage the link module 114 and maintain communication service such as a radio communication link with other devices. For example, the resource scheduler 116 may receive requests for allocation of uplink resources from individual UTs 108, determine grant data 194 allocating uplink resources to the requesting UTs 108, send the grant data 194 to the requesting UTs 108, receive and respond to a handover request 192, and so forth.

The resource scheduler 116 may also allocate downlink resources during operation. Operation of the resource schedulers 116 onboard a plurality of satellites 102 may also be responsive to handover requests 192 associated with one or more mobile UTs (MUTs) 108(M) as described below. The satellite 102 is discussed in more detail with regard to FIG. 2.

The resource scheduler 116 may determine resource allocation such as timeslot, frequency, and so forth that are allocated to particular spots. A spot may be associated with a particular geographic area and the communication resources allocated to that geographic area. In some implementations, the footprint of the spot may extend beyond, or may be within, the geographic area associated with that spot. For example, actual coverage of a signal transmitted by the satellite using the spot may extend beyond the edges of the geographic area.

A ground segment of the system 100 may comprise one or more ground stations 106 that are in communication with one or more satellites 102. The ground stations 106 may pass data between the satellites 102, a management system 150, networks 144 such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground segment may include or utilize one or more communication networks 144. For example, the ground station 106 may connect to a terrestrial fiber optic communication network 144. The ground station 106 may act as a network gateway, passing data between the one or more communication networks 144 and the satellites 102, between ground stations 106, and so forth. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased antenna arrays), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156. The management system 150 may comprise one or more servers or other computing devices. In some implementations, the management system 150 may determine if a handover request 192 received from an MUT 108(M) is valid, and responsive to that may provide handover data 164. The management system 150 may send data to the associated satellites 102 to facilitate the handover.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts position, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data 164 that indicates when communication is to be transferred from a first spot to a second spot. An intrasatellite handover occurs when the first and second spots are provided by the same satellite 102. An intersatellite handover occurs when the first and second spots are provided by different satellites. In implementations in which the MUT 108(M) is operated in a self-triggered handover mode, the handover data 164 may be determined responsive to receipt of the handover request 192 from the MUT 108(M).

The scheduling system 156 may also specify in the handover data 164 communication parameters such as frequency, timeslot indicative of when transmission is permitted, and so forth. During operation, the scheduling system 156 may use information such as the orbital data 154, system status data 158, user terminal data 160, and so forth. In some implementations, the scheduling system 156 may implement one or more of the operations described with respect to the resource scheduler 116. For example, responsive to a handover request 192 that is associated with an intrasatellite handover, the resource scheduler 116 of that satellite 102 may determine the handover data 164.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a geographic position (geolocation) of a particular UT 108 operating in a normal mode. This may comprise current position data or predicted position data. The current position data is associated with a first accuracy of the reported position relative to a ground truth or absolute position. For example, the current position data may comprise information about a particular MUT 108(M) that is accurate (relative to the Earth) to less than a specified threshold, such as 100 meters. While operating in the self-triggered handover mode, the user terminal data 160 may be limited to information such as a current spot identifier indicative of the spot currently used to provide communication service to the MUT 108(M), distance data between the MUT 108(M) and a specified reference point such as a center of a geographic area associated with a spot, received signal strength data (RSS) of a signal associated with one or more spots, and so forth. In some implementations, while operating in the self-triggered handover mode, the user terminal data 160 that is determined based on operation of the system 100 or based on information received from the MUT 108(M) may be limited such that precise position of the MUT 108(M) may not be derived.

The user terminal data 160 may also include other information such as a current operating mode, priority assigned to data associated with that UT 108, a type or category of UT that is indicative of the communication capabilities of that particular UT 108, and so forth. For example, a first mobile UT 108(1) may be a first category of device that has more powerful transmitters, backup power supply, and so forth and that is used on a search and rescue aircraft. Continuing the example, a second mobile UT 108(2) may be in a second category of device, using less expensive and less powerful transmitters, omitting the backup power supply, and used on an uncrewed aerial vehicle. The user terminal data 160 may also include information such as a priority allocation associated with a particular UT 108. For example, the first UT 108(1) may be assigned a higher priority relative to the second UT 108(2). Over time, different versions, types, or categories of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2). In some implementations, the handover data 164 may be determined by the management system 150 responsive to current position data. For example, for fixed UTs 108 or MUTs 108(M) operating in a normal mode that are providing or have provided current position data, the management system 150 may determine the handover data 164 without a handover request 192. In implementations in which the self-triggered handover mode is used by the MUT 108(M), the management system 150 may determine the handover data 164 based on the handover request 192. For example, responsive to the handover request, the management system 150 or another portion of the system 100 may determine the handover data 164 that is then provided to the requesting MUT 108(M) and other associated devices such as the satellites 102 associated with the handover.

While providing communication services to a first set of UTs 108 that may include an MUT 108(M) operating in the self-triggered handover mode, the resource scheduler 116 of the first satellite 102(1) manages access. This may include managing access by the first set of UTs 108 to one or more of an uplink or a downlink. This management may include, but is not limited to, allocating communication resources of the uplink to the individual UTs 108 in the first set of UTs 108. For example, the first UT 108(1) may request uplink resources to send 50 MB of data, while the MUT 108(M) requests uplink resources to send 1 GB of data, and so forth.

For UTs 108 operating in the normal mode, the scheduling system 156 may determine handover data 164 at regular intervals. For example, handover data 164 may be generated for handover assessment intervals that are five seconds long.

In other implementations, the handover data 164 may be determined on demand, at irregular intervals, and so forth. For example, for MUTs 108(M) operating in the self-triggered handover mode, the scheduling system 156 may determine the handover data 164 responsive to a handover request 192.

In one implementation, the handover data 164 may involve the scheduling system 156 using the orbital data 154 and the geolocation of the UTs 108 to determine which UTs 108 will be moving out of range of the satellites 102 currently providing communication services to those UTs 108. Based on the orbital data 154 and the geolocation of each UT 108, the next satellite 102 may be determined. For example, this may be a satellite 102 that is already in range, or will be in range, at the handover time. In some implementations, the handover data 164 may include a set of next satellites 102. For example, the handover data 164 may comprise a set of satellite IDs that indicate a primary satellite and a secondary satellite. Continuing the example, the second satellite 102(2) may be designated as the primary satellite expected to begin providing communication service to the UT 108 at the handover time. In the event the satellite 102(2) is unable to allocate resources to provide communication service to the UT 108, exception data indicative of this may be generated and provided to one or more of the network management system 150, a secondary satellite 102(3), the UT 108, or other devices. For example, the second satellite 102(2) may use a UT 108 to relay the exception data to the first satellite 102(1) and the secondary satellite 102(3). The first satellite 102(1) may send the exception data to the UT 108. The secondary satellite 102(3) may then allocate resources to provide communication service to the UT 108, and may subsequently provide the communication service beginning at the handover time.

The satellite 102 providing communication services may manage its uplink by providing grant data 194 to UTs 108. The grant data 194 is indicative of one or more parameters associated with uplink communication between the UT 108 and the satellite 102. For example, the grant data 194 may indicate the uplink frequency, downlink frequency, assigned timeslot, signal encoding, quantity of data permitted to be sent, and forth. In one implementation, the grant data 194 may be generated by the satellite 102. For example, the satellite 102(1) may receive uplink requests and responsive to those uplink requests send grant data 194.

The UT 108 includes a communication system 180 to establish communication with one or more satellites 102 and transfer data. The communication system 180 may comprise a network interface. The UT 108 passes data between the constellation of satellites 102 and the computing device 110. The computing device 110 may execute one or more application modules 196. The data transferred includes upstream data 112 sent by the computing device 110 or downstream data 142 that is addressed to the UT 108 or the computing device 110. For example, during operation the application module 196 may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, remotely operated vehicle, uncrewed vehicle, and so forth.

During operation, the communication system 180 may utilize one or more of the handover data 164 or the grant data 194 received from the satellite 102. For example, the communication system 180 may use the handover data 164 that is received to perform a handover from a first spot to a second spot. In another example, the UT 108 may request uplink resources to send the upstream data 112. Responsive to the request, the satellite 102 may send grant data 194 allocating uplink resources for the UT 108 to use to send the upstream data 112 to the satellite 102.

The communication system 180 of the UT 108 may include components similar to those of the communication system of a satellite 102 and may perform similar communication functionalities. For example, the communication system 180 may include one or more modems, digital signal processors, power amplifiers, antennas (including at least one antenna that implements multiple antenna elements, such as a phased antenna array), processors, memories, storage devices, communications peripherals, interface buses, and so forth. Continuing the example, the network interface may comprise the communication system 180.

The communication system 180 of the UT 108 may also allow for operation in various modes such as a normal mode or the self-triggered handover mode. In some implementations, the mode used by the communication system 180 may be determined based on data received from the application module 196 or another control input. In other implementations, the mode used by the communication system 180 may be remotely configured, such as upon receiving a control message from the satellite 102 or the management system 150. For example, to further obscure the presence and operation of a particular MUT 108(M) operating in self-triggered handover mode, the management system 150 may remotely transition several other UTs 108 to operate in the self-triggered handover mode at the same time.

The UT 108 includes a tracking system 182. The tracking system 182 uses ephemeris data 184 to determine tracking data 186. The ephemeris data 184 provides information indicative of orbital elements of the orbit 104 of one or more satellites 102. For example, the ephemeris data 184 may comprise orbital elements such as "two-line element" data for the satellites 102 in the constellation that are broadcast or otherwise sent to the UTs 108 using the communication system 180.

The tracking system 182 may use the current position data indicative of the current position of the UT 108 with high accuracy and the ephemeris data 184 to determine the tracking data 186 for the satellite 102. For example, based on the current position of the UT 108 and the predicted position and movement of the satellites 102, the tracking system 182 is able to calculate the tracking data 186. The tracking data 186 may include information indicative of azimuth, elevation, distance to the second satellite 102(2), time of flight correction, or other information associated with a specified time. The determination of the tracking data 186 may be ongoing. For example, the first UT 108 may determine tracking data 186 every 100 ms, every second, every five seconds, or at other intervals.

With regard to FIG. 1, the uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106.

In some implementations, the satellites 102 may also be in communication with one another. For example, an inter-satellite link (ISL) 198 may provide for communication between satellites 102 in the constellation. In some implementations, the ISL 198 may be used to exchange information between satellites 102 to determine handover data 164, coordinate the handovers of an MUT 108(M), and so forth.

The UT 108 may send upstream data 112 using the system 100. For example, the upstream data 112 may originate from the UT 108, or may be received by the UT 108 from the computing device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 144, such as the Internet.

The UT 108 may include a mobility management system 188 that utilizes state data 190 to determine handover requests 192. The state data 190 comprises information about the state of the mobile UT 108. For example, the state data 190 may comprise a current position as determined by a navigation system of the UT 108, received signal strength of one or more spots, and so forth. The state data 190 is discussed in more detail with regard to FIG. 4.

In one implementation, the mobility management system 188 may determine, based on the state data 190, that the MUT 108(M) will be moving from one spot to another, or would be better served by transitioning from one spot to another. Based on this determination, the mobility management system 188 may determine a handover request 192. The handover request 192 is discussed in more detail with regard to FIG. 5. Operation of the mobility management system 188 is discussed in more detail with regard to FIGS. 6 and 7.

The handover request 192 is then sent via the communication system 180 to other portions of the system 100, such as the satellite 102 currently providing communication service, the management system 150, and so forth. Responsive to the handover request 192, the handover data 164 is received by the communication system 180 at the MUT 108(M). Responsive to the handover data 164, the communication system 180 proceeds to establish communication at or after the handover time using the spot or other information provided by the handover data 164.

Ground stations 106 may have more substantial communication infrastructure, such as uplink transmitters with greater power than a UT 108, antennas with greater gain than a UT 108, sites that provide clear line of sight from horizon to horizon, and so forth. A ground station 106 may be in communication with a plurality of satellites 102 at a time. In some implementations, the ground station 106 may implement the resource scheduler 116 as described herein.

The system 100 may include one or more point of presence (PoP) systems 146. Each PoP system 146 may comprise one or more servers or other computing devices. Separate PoP systems 146 may be located at different locations. In one implementation, a PoP system 146 may be associated with providing service to a plurality of UTs 108 that are located in a particular geographic region.

The PoP systems 146 may manage communication between the system 100 and the network 144. For example, a first PoP system 146 may receive the upstream data 112 and send that upstream data 112 to the network 144. In another example, the first PoP system 146 may receive the downstream data 142 and proceed to attempt delivery of the downstream data 142 to the UT 108.

The PoP system 146 is in communication with one or more ground stations 106(1), 106(2), . . . , 106(G) and the management system 150. In some implementations one or more functions may be combined. For example, the PoP system 146 may perform one or more functions of the management system 150. In another example, the PoP system 146 may be included in an integrated ground station 106.

The PoP system 146 may determine the UT 108 that the downstream data 142 is addressed to and determine first communication resource data. The first communication resource data specifies the communication resources, such as the ground station 106, uplink modem at the ground station 106, satellite 102, downlink modem on the satellite 102, and so forth that would result in delivery of the downstream data 142 to the UT 108. The downstream data 142 may comprise a single packet or other unit of data transfer, or a plurality of packets or other units of data transfer that are associated with delivery to the particular UT 108.

In some implementations, traffic associated with a particular UT 108, such as an MUT 108(M), may be routed through a single network point, such as a master PoP, firewall, traffic shaper, and so forth. Downstream data 142 received via one or more ground stations 106 in different physical locations may be forwarded to a master PoP and processed before sending to the network 144. This processing may include removing or replacing packet header data, reordering packets, and so forth. The processing may serve to remove information that would otherwise indicate one or more of the particular ground station 106 or PoP 146 that was used to receive the downstream data 142.

The satellite 102, the ground station 106, the user terminal 108, the computing device 110, the management system 150, the PoP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
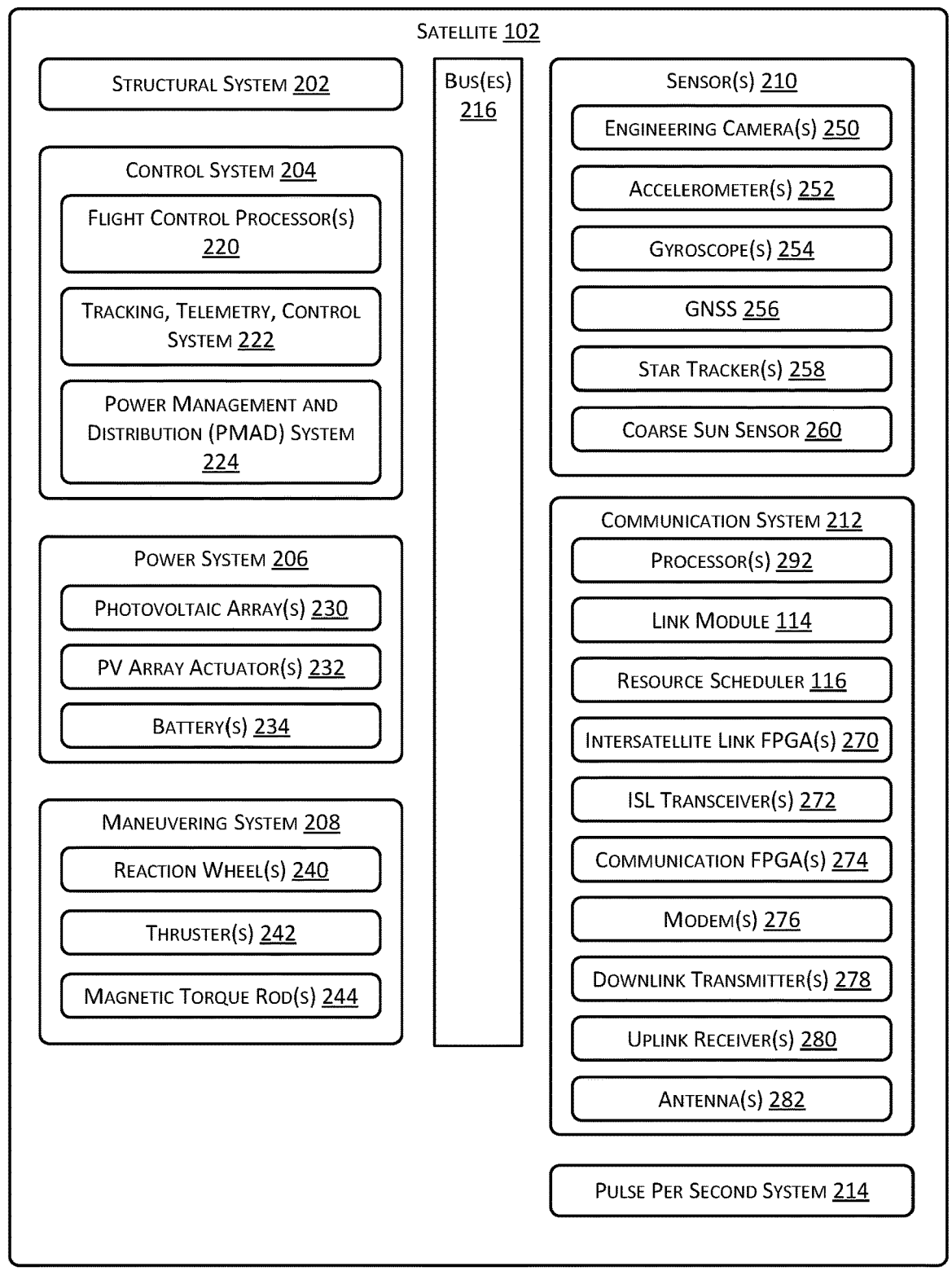
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellent. For example, an electrothermal thruster may use water as propellent, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations, the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may comprise one or more processors 292 to execute instructions. The communication system 212 may comprise the link module 114 and the resource scheduler 116. In one implementation, the link module 114 may comprise an antenna 282 such as a phased antenna array (PAA) that is capable of simultaneously providing multiple subbeams or gain patterns in different directions. A spot may comprise a particular subbeam that is targeted to cover a specified portion of the Earth (including the airspace above that portion) (see FIG. 3) while the satellite 102 is in a particular portion of the orbit 104. In one implementation, the link module 114 may adjust or steer the direction of the subbeam relative to the satellite 102 to keep the subbeam pointed at a target location on the Earth while the satellite 102 is above the horizon and in range of that target location. As the satellite 102 moves out of range of the target location, the subbeam may be retargeted to another target location that is moving into range. The different subbeams on the satellite 102 may be directed to different spots. In another implementation, the subbeam may continuously sweep across the surface of the Earth, such as in a line parallel to a ground track of the satellite 102.

The communication system 212 may include one or more modems 276, digital signal processors, power amplifiers, antennas (including at least one antenna that implements multiple antenna elements, such as a phased antenna array) 282, processors 292, memories, storage devices, communications peripherals, interface buses 216, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission. The modems 276 operate in conjunction with other components, such as receivers, transmitters, and one or more antennas 282 to one or more of send or receive data.

Each satellite 102 may use one or more antennas 282 or antenna elements to provide a beam for transmission and reception of radio signals. For example, the satellite 102 may have a phased antenna array that allows for gain in a particular direction, producing an antenna gain pattern. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102.

The beam provided by the satellite 102 may comprise a plurality of subbeams. Subbeams on a satellite 102 may use different frequencies, timeslots, and so forth, to communicate with the UT 108. Each subbeam provides coverage of a particular spot comprising a geographic area. Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target spot is in range of the satellite 102, the subbeam tracks the target spot. As the satellite 102 moves in orbit 104, the boundary of the footprint of the subbeam on the surface changes due to the relative angle between the satellite 102 and the Earth. For example, the footprint boundary of the subbeam may change from approximately an oval shape while the satellite 102 is low on the horizon relative to the target location, to a circular shape while directly overhead, then to an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam and the corresponding spot. For example, a first modem 276(1) provides communication to UTs 108 in a first spot using a first subbeam while a second modem 276(2) provides communication to UTs 108 in a second spot using a second subbeam.

In some implementations, the communication system 212 may include hardware to support the intersatellite link 198. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased antenna array may be used to provide communication between the satellite 102 and the UTs 108.

The communication system 212 may determine one or more of handover data 164 or grant data 194. For example, the handover data 164 may be determined by the communication system 212 for an intrasatellite handover that specifies the spot to handover to and parameters associated with using that spot. In another example, the grant data 194 may be determined that specifies uplink resources for a UT 108 to communicate with the satellite 102. For example, the communication FPGA 274 may process a grant request that is received from a UT 108 by the uplink receiver 280. Responsive to the grant request, and subject to the resource scheduler 116, the communications FPGA 274 may determine grant data 194 that is then sent using the downlink transmitter 278. In another example, the resource scheduler 116 may determine grant data 194 without a grant request.

Figure 3:
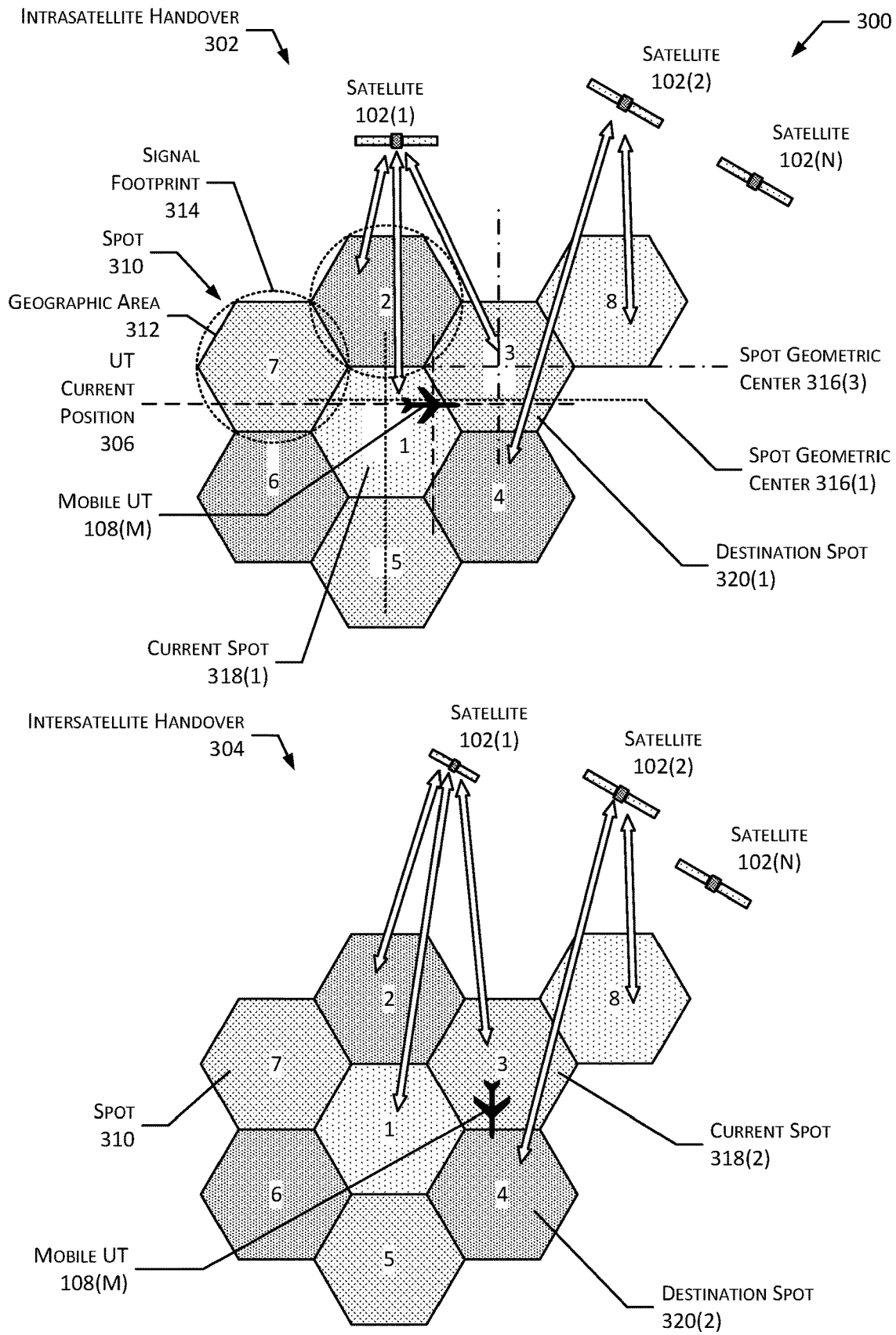
FIG. 3 illustrates spots providing communication service to a mobile user terminal and an intrasatellite handover and an intersatellite handover, according to some implementations.

FIG. 3 illustrates at 300 spots providing communication service to a mobile user terminal 108(M) and an intrasatellite handover 302 and an intersatellite handover 304, according to some implementations. A UT current position 306 is shown, depicting the geographic position or geolocation of the MUT 108(M). The UT current position 306 is within a current spot 318. A destination spot 320 may be designated as the spot 310 that the UT 108 has either moved into, or is predicted to move into at a future time.

An intrasatellite handover 302 is shown in which communication service provided to an MUT 108(M) transitions from a first spot 310 to a second spot 310 provided by the same satellite 102. The relative position of the spots 310 with respect to one another and the satellite 102 are also shown.

A spot 310 may comprise one or more of a spatial location, geographic area 312, communication resources (not shown) allocated to provide communication within and near the geographic area 312, and signal footprint 314 associated with those communication resources. For example, the spatial location may comprise a portion of an orbit 104, a geographic area may comprise a specified area on Earth, and so forth. In the implementation depicted here, the spot 310 may comprise a geographic area 312 on the Earth and the airspace or volume corresponding with that geographic area 312. One or more UTs 108 may be present within one or more spots 310.

The geographic areas 312 associated with the spots 310 (1), 310(2), . . . , 310(S) may be arranged to cover at least a portion of a surface, physical area such as a portion of the sky, and so forth. For example, the Earth may be tessellated into geographic areas 312 that are hexagonal or some other space filling polygon arrangement. In some implementations, the geographic areas 312 of the spot 310 may be sized to correspond to the signal footprint 314 of a subbeam. For example, the spot 310 may be based on the signal footprint 314 or area on the surface of the Earth that corresponds to signal coverage at a specified metric such as signal to noise level or received power of an uplink subbeam and a downlink subbeam. In implementations in which the spots 310 are directed towards space, each spot 310 is associated with a respective physical area such as a solid angle of the sky, portion of an orbit 104, and so forth.

The geographic areas 312 associated with respective spots 310 may be tessellated and non-overlapping. In comparison, the signal footprint 314 covered by the respective communication resources may differ from the boundaries of those geographic areas 312. For example, given the parameters of communication resources such as antenna gain, frequency, transmit power levels, co-channel interference, and so forth, signal coverage may extend beyond the edges of the respective geographic area 312. In another example, terrain such as high mountains may "shadow" or block coverage and reduce signal coverage to within the edges of the respective geographic area. In this illustration, the signal footprints 314 for some of the spots 310 are depicted. Others are omitted for clarity of illustration and not as a limitation. Near the edges of a geographic area 312 a UT 108 may be within two or more signal footprints 314 associated with different spots 310.

Each of the geographic areas 312 or the signal footprints 314 may be associated with one or more points. For example, each of the geographic areas 312 has a corresponding spot geometric center 316. In another example, each signal footprint 314 may have a corresponding footprint center (not shown).

In some implementations, the handover request 192 may be indicative of the approximate location of the MUT 108(M) as a distance relative to one or more of points, spot identifier, and so forth. For example, the handover request 192 may indicate a distance between the UT current position 306 and the spot geometric center 316(1) of the current spot 318, a distance between the UT current position 306 and the spot geometric center 316(3) of the destination spot 320, and so forth.

By way of illustration, and not as a limitation, the MUT 108(M) is shown at a geographic location that is within the spot 310(1). Each satellite 102 may provide communication services in a plurality of spots 310. In this illustration satellite 102(1) provides coverage in spots 310(1), 310(2), and 310(3). In comparison satellite 102(2) provides coverage in spots 310(4) and 310(8). The number and distribution of spots 310 is for illustration only, and is not provided as a limitation.

While operating in the normal mode, the MUT 108(M) may provide data that is indicative of a geolocation of the MUT 108(M) with a relatively high accuracy, such as the UT current position 306 data. While in the normal mode, the system 100 allocates communication resources to the current spot 310 that the MUT 108(M) is located within. As shown here, a single satellite 102(1) that is providing service to spot 310(1) at this time is used to send downstream data 142 and is also providing grant data 194 and associated uplink resources to the MUT 108(M). As the MUT 108(M) operating in normal mode moves, the management system 150 uses the information about the movement to anticipate a handover and determine handover data 164. As a result, the operation of the system 100 is highly efficient.

In comparison, while in the self-triggered handover mode, the handover data 164 is determined responsive to the handover request 192 received from the MUT 108(M). While this may result in a slight reduction in the efficiency of the system 100, it provides a substantial reduction in the amount of information about the position of the MUT 108(M) that is available to the system 100 or a third party. For example, the management system 150 may only maintain user terminal data 160 that is indicative of the MUT 108(M) being provided service by a particular spot 310.

With regard to the intrasatellite handover 302, the MUT 108(M) will be moving from spot 310(1) to spot 310(3). Because both spot 310(1) and spot 310(3) are provided by the same satellite, satellite 102(1), this is an intrasatellite handover.

In one implementation, a handover request 192 that involves an intrasatellite handover 302 may be responded to by the resource scheduler 116 or other system operating on the serving satellite 102 that is providing the spots 310. In this implementation, the serving satellite 102 may determine and send the handover data 164 to the MUT 108(M).

In comparison, with regard to the intersatellite handover 304, the MUT 108(M) will be moving from spot 310(3) to spot 310(4). Spot 310(4) is provided by a different satellite, satellite 102(2). Because spot 310(3) and 310(4) are provided by the different satellites, satellite 102(1) and satellite 102(2) respectively, this is an intersatellite handover.

In one implementation, a handover request 192 that involves an intersatellite handover 304 may be forwarded to the management system 150 for determination of the handover data 164.

During operation, the MUT 108(M) may determine state data 190 that is indicative of received signal strength (RSS) of signals associated with respective spots 310 in a set of one or more spots 310. The set of spots may include the current spot 318 and one or more adjacent spots 310, such as the destination spot 320.

The communication system 180 may utilize a directional antenna, such as a phased array antenna. The directional antenna may be operated to direct a receive or transmit pattern towards a particular satellite 102 at a particular time. Depending upon the construction and configuration, the directional antenna may exhibit some delay or latency when changing from pointing in a first direction to pointing in a second direction. For example, a mechanically steered parabolic antenna or log periodic array will require some time to move from a first direction aimed at the first satellite 102(1) to a second direction aimed at the second satellite 102(2).

In some implementations, to minimize the latency associated with repointing the directional antenna, the MUT 108(M) may acquire RSS information for signals associated with spots 310 that are provided by a single satellite 102 serving the current spot 318. For example, as shown in FIG. 3 the MUT 108(M) may acquire RSS information for spots 310(1), 310(2), and 310(3) that are provided by the first satellite 102(1). Continuing the example, attempting to repoint the directional antenna to acquire RSS data about signals associated with spots 310(4) and 310(8) that are provided by the second satellite 102(2) may result in latencies that are too long, and may interfere with ongoing communication between the MUT 108(M) and the first satellite 102(1) using the current spot 318.

In implementations in which the latency associated with repointing the directional antenna is minimal or can be accommodated, the MUT 108(M) may acquire RSS information for spots 310 provided by a plurality of satellites 102. For example, if the directional antenna comprises digital beamformers that allows for two different pointing directions to be accommodated simultaneously, the RSS information may be obtained for spots 310 associated with two or more satellites 102. Continuing the example, one pointing direction may be used to maintain ongoing communication with the current spot 318 while obtaining RSS information for others spots 310 provided by the serving satellite 102. The second pointing direction may be used to obtain RSS information for other spots 310 provided by other satellites 102.

By way of illustration, and not as a limitation, each satellite 102 is depicted as serving a particular spot 310 at the time shown. It is understood that a satellite 102 may provide a plurality of spots 310 during a particular time interval. For example, satellite 102(2) may provide communication services to spots 310(1)-(7) while satellite 102(2) provides communication services to spots 310(8)-(15) and so forth. It is also understood that different satellites 102 may service the same or different spots 310 at the same or different times. For example, satellite 102(1) and satellite 102(2) may provide service to spot 310(3) during the same time interval. This redundancy in coverage may be provided for reasons including, but not limited to, providing disparity of path to allow for reliable communication due to obstacles local to the UT 108 such as a mountain or building, to mitigate radio frequency interference, and so forth.

Figure 4:
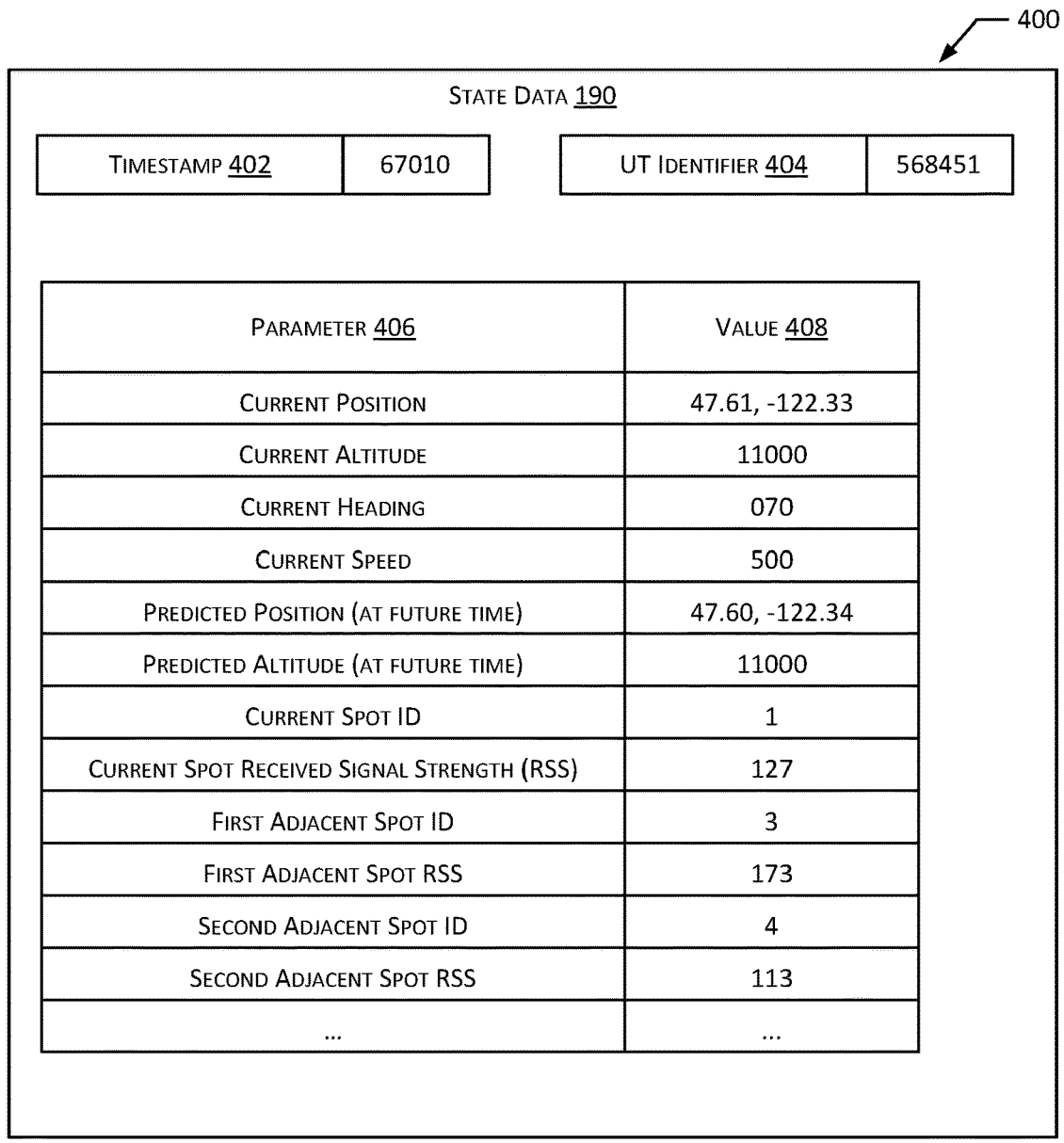
FIG. 4 illustrates state data and spot data that may be used to determine a handover request, according to some implementations.

FIG. 4 illustrates at 400 state data 190 and spot data 450 that may be used to determine a handover request 192, according to some implementations. During operation the UT 108 may determine state data 190. The state data 190 may be updated on a regular schedule, on demand, or a combination thereof. For example, the state data 190 may be updated every 100 ms, or upon occurrence of an interrupt. The mobility management system 188 uses at least a portion of the state data 190 during operation to determine the handover request 192.

The state data 190 may comprise a timestamp 402 indicative of a time associated with the state data 190. In some implementations, individual values 408 may be associated with respective individual timestamps 402.

The state data 190 may comprise a UT identifier 404 that is indicative of the UT 108. For example, the UT identifier 404 may comprise a serial number assigned at manufacture.

The state data 190 may comprise one or more parameters 406 and associated values 408. The parameters 406 may include one or more of the following. In some implementations the state data 190 may comprise, or the mobility management system 188 may utilize, a subset of the available parameters 406.

A current position may be indicative of a geolocation of the UT 108 with respect to a specified datum. The current position may be determined based on output from a navigational system. For example, a GNSS may comprise a GPS receiver that provides the current latitude and longitude of the UT 108. In another example the navigational system may utilize dead reckoning or inertial navigation to determine the current position.

A current altitude may be indicative of an altitude of the UT 108 with respect to a specified datum. For example, the current altitude may be determined based on output from a barometric altimeter, radar altimeter, laser altimeter, GNSS receiver, or other device. In another example dead reckoning or inertial navigation may be used to determine the current altitude.

A current heading is indicative of a direction, relative to a reference direction such as true north, of the UT 108. For example, the current heading may be determined based on output from a magnetic compass, GNSS receiver, inertial navigation system, or other device.

A current speed is indicative of a speed, relative to a reference datum, of the UT 108. For example, the current speed may be determined based on output from a pitot system, GNSS receiver, inertial navigation system, or other device.

A predicted position is indicative of a predicted geolocation of the UT 108 at a future time. For example, the predicted position may be indicative of a predicted geolocation of the UT 108 at a next handover interval. In some implementations, the predicted position may be calculated based on the current position, current heading, and current speed. In other implementations, the predicted position may be determined based on this or other information, such as a flight plan, sailing plan, set of waypoints indicative of a planned route, and so forth.

A predicted altitude is indicative of a predicted altitude of the UT 108 at a future time. This may be determined similar to that of the predicted position.

A current spot identifier (ID) is indicative of the current spot 318 that is currently providing service to the UT 108.

A current spot RSS indicates a received signal strength of a signal associated with the current spot 318. For example, the current spot RSS may be indicative of a received signal strength of a broadcast transmission associated with the current spot 318.

The state data 190 may include one or more adjacent spot IDs and associated RSS values. In some implementations, the mobility management system 188 may determine a set of spots 310 comprising at least a portion of the spots 310 that are adjacent to the current spot 318. The set of spots 310 may include the destination spot 320. The mobility management system 188 may determine the destination spot 320 based on the predicted position. For example, the destination spot 320 may comprise the spot 310 that the predicted position is within.

As described above with regard to FIG. 3, the MUT 108(M) may acquire RSS information for other spots 310. This RSS information may be included in the state data 190.

The mobility management system 188 may use spot data 450 during operation. The spot data 450 may comprise information about one or more of the spots 310. In one implementation, the spot data 450 may comprise information about the geographic areas 312 associated with respective spots 310. The spot data 450 may comprise a spot ID and associated information such as a spot geometric center 316 and coordinates indicative of the geolocation of the geographic area 312. The spot data 450 may comprise other information such as a spot shape, radius, length, width, or other dimensional information.

FIG. 5 illustrates at 500 the handover request 192, the handover data 164, and the grant data 194, according to some implementations. As described below with regard to FIG. 6, based on the state data 190 the mobility management system 188 determines the handover request 192. While operating in the self-triggered handover mode, the handover request 192 is then sent to other elements of the system 100, such as the satellite 102 providing the current spot 318, which may then be sent to the management system 150.

The handover request 192 may comprise one or more parameters 502 and associated values 504. The parameters 504 may include one or more of the following. In some implementations, the handover request 192 may comprise, or the other elements of the system 100 may utilize, a subset of the parameters 502 shown here or otherwise available.

The UT identifier, as with the UT identifier 404 described above, is indicative of the UT 108 that has issued the handover request 192. In some implementations this data may be provided in a separate data element, such as in a packet header.

The mobility management system 118 may determine the destination spot 320. This may be determined based on one or more of the predicted position or the RSS information. The handover request 192 may comprise a primary destination spot ID that is indicative of the destination spot 320.

In some situations, the management system 150 may disregard this information, and provide handover data 164 indicative of a different spot 310.

The handover request 192 may comprise information indicative of one or more distances from a position of the UT 108 to one or more specified points. The position may be the current position or the predicted position. The point may be specified with respect to the spot 310, such as the spot geometric center 316, a particular vertex of the geographic area 312, and so forth.

A distance from the UT current position 306 or the predicted position to the current spot (geometric) center 316 may be included in the handover request 192.

A distance from the UT current position 306 or the predicted position to the destination spot (geometric) center 316 may be included in the handover request 192.

In some implementations information about additional spots may be included in the handover request 192. For example, information about other adjacent spots 310 such as a secondary destination spot ID indicative of an alternative destination spot 310 may be included. Distance information associated with this secondary destination spot may also be included.

Current spot 318 received signal strength (RSS) may comprise information indicative of a signal strength, as received by the MUT 108(M), of a signal associated with the current spot 318.

The handover request 192 may also include RSS data associated with other spots, such as the primary destination spot, the secondary destination spot, and so forth.

In some implementations, particular combinations of information may be avoided in the handover request 192 that is sent. For example, to avoid revealing information that may be used to derive the position of the UT 108, the handover request 192 may omit including more than one distance to a specified point, RSS information from more than one spot, and so forth.

In some implementations, the values 504 included in the handover request 192 may be indicative of a ranking rather than a particular measurement. For example, instead of providing linear measurements such as kilometers in the distances, the distances may be ranked in ascending order of lowest to greatest distance. Continuing the example shown the "distance to destination spot center" may have a value 504 of rank "1", while "distance to current spot center" has a value 504 of rank "2", and "distance to secondary destination spot center" has a value 504 of rank "3". Likewise, the RSS values may be ranked in descending order of greatest to lowest received signal strength. With this example, "primary destination spot RSS" has a value 504 of rank "1", "current spot RSS" has a value 504 of rank "2", and so forth.

In one implementation, a set of spots that are adjacent to the current spot may be determined. The handover request 192 may include values 504 indicative of one or more of a first set of rank values or a second set of rank values. The first set of rank values may be determined by the UT 108. Each rank value in the first set of rank values may be indicative of a distance from the UT 108 to a point associated with respective ones of the set of spots. The second set of rank values may be determined by the UT 108. Each rank value in the second set of rank values may be indicative of a received signal strength of a received signal associated with the respective one of the set of spots.

The handover data 164 may comprise one or more parameters 542 and associated values 544. The parameters 542 may include one or more of the following. In some implementations the handover data 164 may comprise a subset of the parameters 542 shown here.

The UT identifier, as with the UT identifier 404 described above, is indicative of the UT 108 that has issued the handover request 192. In some implementations this data may be provided in a separate data element, such as in a packet header.

A handover time is indicative of the time when the handover is to occur.

A next satellite ID is indicative of the next satellite that will be providing the next spot 310 after the handover time. In the case of an intrasatellite handover, there may be no change in satellite 102 after the handover.

A next spot ID is indicative of the next spot 310 that will be providing service to the MUT 108(M) after the handover time.

Other information such as data indicative of a particular subbeam, random access channel allocation, cryptographic credentials such as a spot cryptographic key associated with the next spot 310, broadcast channel associated with the destination spot 310, and so forth may be included in the handover data 164.

The grant data 194 may comprise one or more parameters 562 and associated values 564. The parameters 562 may include one or more of the following. In some implementations the grant data 194 may comprise a subset of the parameters 562 shown here. During operation, the communication system 180 may use the grant data 194 to send upstream data 112, receive downstream data 142, and so forth.

The UT identifier, as with the UT identifier 404 described above, is indicative of the UT 108 that has issued the handover request 192. In some implementations this data may be provided in a separate data element, such as in a packet header.

In some implementations a temporary UT identifier may be used. A temporary UT identifier may be assigned to a particular UT 108 within a particular spot 310. If that same UT 108 transfers to use a different spot 310 or subbeam therein, a different temporary UT identifier would be issued. For example, the UT 108 having the UT identifier of "568451998873" may be assigned a first temporary UT ID of "15" while using spot 310(1) and then assigned a second temporary UT ID of "3" while using spot 310(2). Use of the temporary UT identifier may reduce the quantity of data transmitted. For example, instead of a 64 byte UT identifier a 4 bit value may be used.

The satellite Id is indicative of the satellite 102 providing the spot 310.

A next handover time may indicate the next time a handover may occur.

The synchronization data provides information to the UT 108 about the time synchronization signal used to synchronize the UT 108 with the spot 310 or a subbeam thereof. For example, the synchronization data may indicate a frequency, encoding, or other parameter to allow the UT 108 to determine the time synchronization to be used.

The subbeam identifier provides information about the subbeam to be made available to the UT 108 for use.

The grant data 194 may include uplink frequencies for use by the UT 108 to send to the satellite 102 while the downlink frequencies are for use by the UT 108 to receive from the satellite 102.

The timeslot may indicate an interval of time during which communication between the UT 108 and the satellite 102 is allocated to take place. The timing of a timeslot may be relative to the time synchronization signal. For example, each second may be divided into ten 100 ms timeslots. The first UT 108 may be allocated to send and receive traffic during the fifth timeslot, while other UTs 108 are allocated the remaining time slots for use.

A grant expiration time may be indicative of when the grant data 194 is no longer valid. In other implementations, the grant data 194 may comprise additional information.

Figure 6:
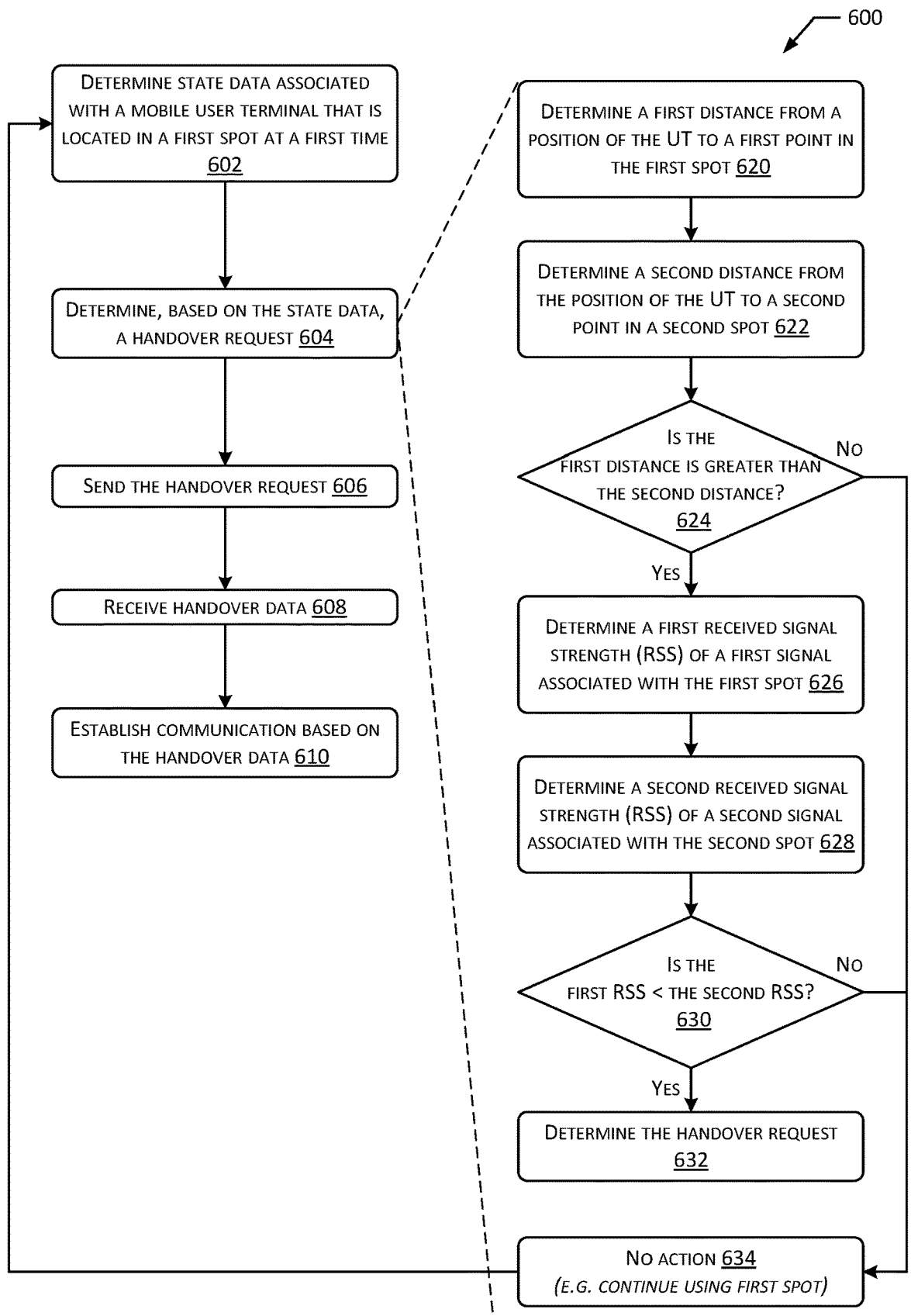
FIG. 6 depicts a flow diagram of a process to handover provisioning of communication service to a mobile UT from one spot to another, according to some implementations.

FIG. 6 depicts at 600 a flow diagram of a process to handover provisioning of communication service to a mobile UT 108(M) from a first spot 310(1) to a second spot 310(2), according to some implementations. The process may be implemented by one or more satellites 102, ground stations 106, user terminals 108, the management system 150, and so forth. This process is associated with the self-triggered handover mode in which the UT 108 does not provide precise information about its current position to the system 100.

At 602 state data 190 associated with a mobile UT 108(M) is determined. The MUT 108(M) is located in a first spot 310(1) at a first time. For example, the MUT 108(M) may be within the geographic area 312 of the current spot 318, may be within the signal footprint 314 of the current spot, or both. The state data 190 may be determined by one or more systems of the MUT 108(M). For example, the mobility management system 188 may determine the state data 190 or receive portions thereof from other systems.

At 604 a handover request 192 is determined based at least in part on the state data 190. For example, the mobility management system 188 may determine the handover request 192. In some implementations, the determination of the handover request 192 may be based on geometry, received signal strength, or a combination thereof. One implementation of this determination is described below with regard to operations 620-634.

At 606 the handover request 192 is sent. For example, the mobility management system 188 may send the handover request 192 to the communication system 180. The communication system 180 may then send the handover request 192 to the serving satellite 102 using a transmitter coupled to an antenna.

At 608 handover data 164 is received. For example, the communication system 180 may comprise a receiver coupled to the antenna that is used to receive the signal conveying the handover data 164. The handover data 164 is indicative of a second spot 310(2) that will provide communication service to the MUT 108(M) at or after a handover time.

At 610 communication is established based on the handover data 164. For example, the communication system 180 may use the handover data 164 to transition at or after the handover time from using the first spot 310(1) to using the second spot 310(2).

Returning to 604, the handover request 192 may be determined based on the state data 190. Information about the geometry of the MUT 108(M) relative to one or more geographic areas 312 may be assessed to determine if the MUT 108(M) has moved from a geographic area 312(1) of a first spot 310(1) into a geographic area 312(2) of a second spot 310(2).

At 620 a first distance is determined from a position of the UT 108 to a first point in the first spot 310(1). The position may be a UT current position 306 or a predicted position. In one implementation, the first point may comprise a geometric center of one or more of a geographic area 312, or a signal footprint 314. In other implementations, other points may be specified, such as a northwestern most vertex of each hexagon of the geographic area 312.

At 622 a second distance is determined from the position of the UT 108 to a second point in a second spot 310(2). The position may be a UT current position 306 or a predicted position. In one implementation, the second point may comprise a geometric center of one or more of a geographic area 312, or a signal footprint 314. In other implementations other points may be specified.

At 624 a determination is made as to whether the first distance is greater than the second distance. If yes, the process may proceed to 626. In another implementation not shown, if yes the process may conclude and utilize the second spot 310(2) as the destination spot 320. If at 624 the determination is no, the process may proceed to 634.

At 626 a first received signal strength (RSS) of a first signal associated with the first spot 310(1) is determined. For example, the RSS of a beacon transmission of the first spot 310(1) may be acquired using the receiver of the MUT 108(M).

At 628 a second RSS of a second signal associated with the second spot 310(2) is determined. For example, the RSS of a beacon transmission of the second spot 310(2) may be acquired using the receiver of the MUT 108(M).

At 630 a determination is made as to whether the first RSS is less than the second RSS. If yes, the process may proceed to 632. If at 630 the determination is no, the process may proceed to 634.

At 632 a handover may be deemed to be triggered, and the handover request 192 is determined. In some implementations the handover request 192 may be indicative of the second spot 310(2) that may represent the destination spot 320.

At 634 no action is taken. For example, the MUT 108(M) may continue to use the current spot 318. The process may then return to 602.

In some implementations, one or more of the operations with respect to 620-634 may be omitted or reordered. For example, 626-630 may occur before 620-624 with corresponding adjustment to the process.

Figure 7:
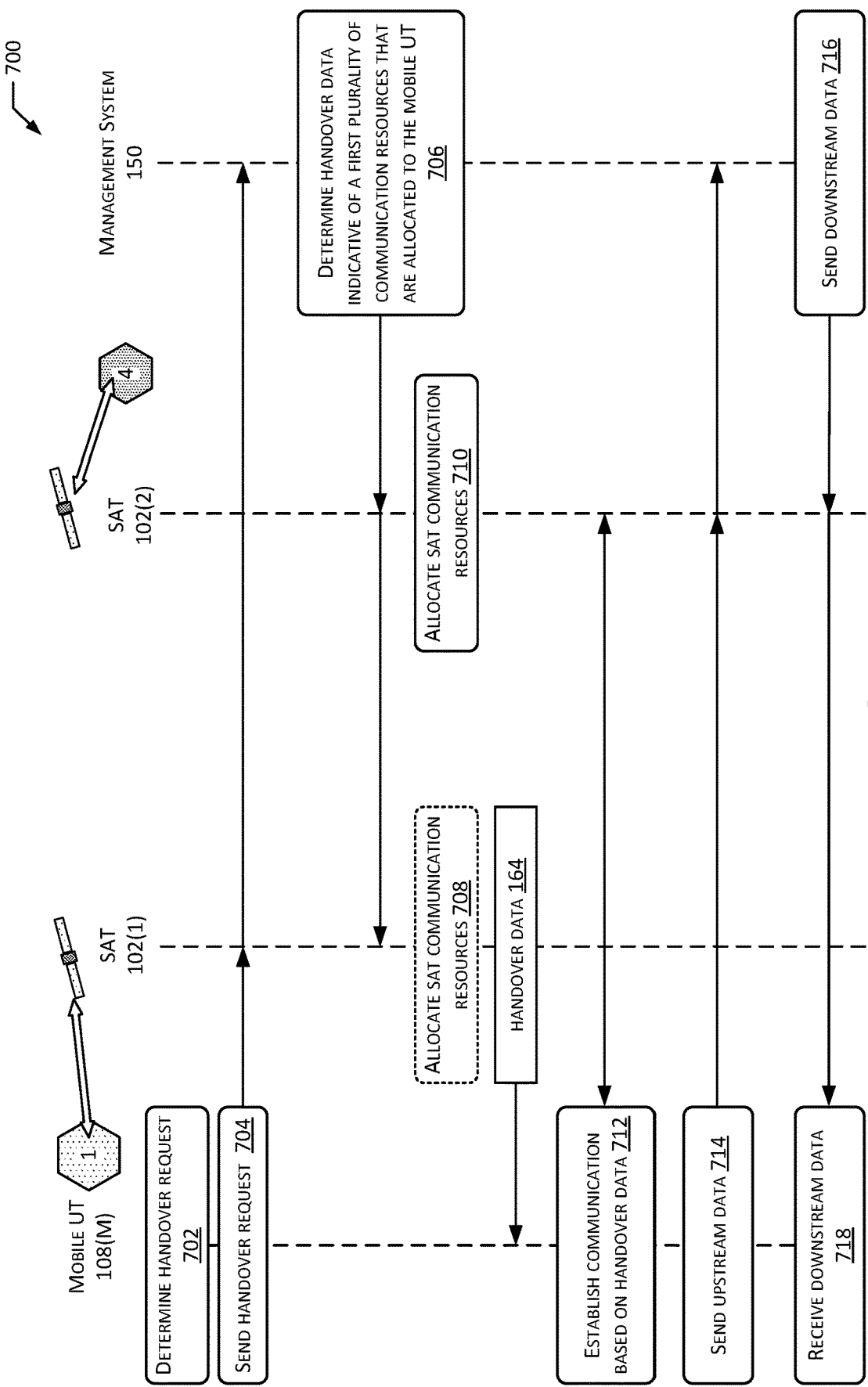
FIG. 7 depicts a flow diagram of a system using the handover request sent by the mobile UT to handover provisioning from one spot to another, according to some implementations.

FIG. 7 depicts at 700 a flow diagram of a system using the handover request 192 sent by the mobile UT 108(M) to handover provisioning from a first spot 310(1) to a second spot 310(2), according to some implementations. The process may be implemented by one or more satellites 102, ground stations 106, user terminals 108, the management system 150, and so forth. This process is associated with the self-triggered handover mode in which the UT 108 does not provide precise information about its current position to the system 100.

At 702 the MUT 108(M) determines a handover request 192. For example, as described with regard to FIG. 6, the mobility management system 188 may determine the handover request 192 based at least in part on the state data 190.

At 704 the handover request 192 is sent. For example, the MUT 108(M) may send the handover request 192 using the first spot 310(1) provided by a first satellite 102(1).

In the instance of an intersatellite handover 304 as described above, the handover request 192 may be sent from the first satellite 102(1) to the management system 150.

In the instance of an intrasatellite handover 302 as described above, the operation of 706 may be performed by the resource scheduler 116 or other system of the first satellite 102(1).

At 706 the management system 150, or a portion thereof such as the scheduling system 156, determines handover data 164 indicative of a first plurality of communication resources that are allocated to the mobile UT 108(M) for use at or after a handover time.

The handover data 164 is determined based at least in part on the data included in the handover request 192. Other data that may be considered in determining the handover data 164 may include the orbital data 154, the system status data 158, the user terminal data 160, and so forth.

In one implementation, the handover data 164 may include one or more of a primary destination spot ID, secondary spot ID, and so forth of spots 310 determined by the mobility management system 188 as destination spots 320 for use after the handover. The management system 150 may determine if communication resources will be available after the handover time within one or more of the proposed destination spots 310 included in the handover request 192 and allocate accordingly. For example, if communication resources are available in the primary destination spot after the handover time, the management system 150 may allocate the communication resources associated with the spot 310 indicated by the primary destination spot ID. If not, the management system 150 may allocate the communication resources associated with the spot 310 indicated by the secondary destination spot ID, or specify another spot ID that may not have been indicated by the handover request 192.

In some implementations, the management system 150 may determine the destination spot 320 to be indicated by the handover data 164 based on one or more of information associated with geometry or received signal strength that is associated with the MUT 108(M) sending the handover request 192. This process may be similar to that described above with respect to FIG. 6, in particular operations 620-634.

For example, if the first distance from a position of the MUT 108(M) to a first point in the current spot 318 is greater than a second distance from the position of the MUT 108(M) to a second point in an adjacent spot 310, the adjacent spot 310 may be deemed to be the destination spot 320, and communication resources allocated accordingly. The position may be a current or predicted position of the MUT 108(M). The point may comprise a specified point relative to one or more of the geographic area 312 or the signal footprint 314. For example, the point may be the spot geometric center 316.

In another example, if the first RSS associated with the current spot 318 is less than a second RSS associated with an adjacent spot 310, then the adjacent spot 310 may be deemed to be the destination spot 320, and communication resources allocated accordingly.

In other examples, various combinations of comparisons based on position and RSS may be used. For example, the distance may be compared as described above, and then the RSS may be compared to determine the destination spot 320 that will be specified in the handover data 164.

The examples describe a single adjacent spot 310 for ease of illustration and not as a limitation. During operation of the system 100, the determination of the handover data 164 may assess a plurality of spots 310 to determine the destination spot 318 indicated in the handover data 164. One or more of the techniques described may be used to assess a set of spots 310 comprising a plurality of spots 310 to be assessed to determine the destination spot 320 used after the handover time. This assessment may comprise comparisons or rankings of information associated with the current spot 318 and ones of the set of spots 310. For example, each adjacent spot 310 in the set of spots 310 may be ranked in ascending order of distance, descending order of RSS, and so forth.

In one implementation the set of spots 310 may comprise spots 310 that are adjacent to the current spot 318. In another implementation the set of spots 310 may comprise spots 310 that are non-adjacent to the current spot 318. In still another implementation the set of spots 310 may comprise spots 310 that are adjacent and non-adjacent to the current spot 318.

In the event of an intrasatellite handover 302, based on the handover data 164 at 708 the first satellite 102(1) may allocate resources associated with the next spot 310 for use by the mobile UT 108(M) at or after the handover time. The first satellite 102(1) sends the handover data 164 to the MUT 108(M) using the first spot 310(1).

In the event of an intersatellite handover 304 shown here, based on the handover data 164 at 710 the second satellite 102(2) allocates satellite communication resources associated with the fourth spot 310(4) for use by the mobile UT 108(M) at or after the handover time.

At 712 the MUT 108(M) establishes communication based on the handover data 164. For example, the communication system 180 may use the handover data 164 to transfer communication services from the first spot 310(1) to the fourth spot 310(4) at or after the handover time.

At 714 the MUT 108(M) may send upstream data 112 using the fourth spot 310(4) to the second satellite 102(2). The second satellite 102(2) may then send the data to its destination, such as to another UT 108, to a ground station 106, to another satellite 102 in the constellation, and so forth.

At 716 the management system 150 or other systems may send downstream data 142 addressed to the MUT 108(M) to the second satellite 102(2). The second satellite 102(2) may use the fourth spot 310(4) to send the downstream data 142 to the MUT 108(M).

At 718 the MUT 108(M) receives the downstream data 142 sent via the fourth spot 310(4).

The second satellite 102(2) may also send grant data 194 (not shown) to the MUT 108(M). The grant data 194 is indicative of the communication resources that have been allocated to provide uplink access to the mobile UT 108(M) on the uplink to the second satellite 102(2) while in the fourth spot 310(4).

In comparison to the self-triggered handover mode depicted in this figure, during normal mode the MUT 108(M) may send current position data, and based on the current position data the management system 150, the resource scheduler 116, or other portions of the system 100 determines handover data 164.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a GNSS receiver may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a first set of one or more processors executing instructions to:
receive a handover request from a first user terminal (UT) that is located within a first geographic area, wherein the handover request comprises first data;
determine, based on the first data, a second geographic area;
determine handover data indicative of the second geographic area and associated with a first time;
send the handover data to the first UT; and
establish communication with the first UT that is located in the second geographic area on or after the first time, based at least in part on the handover data.

2. The system of claim 1, the first data comprising one or more of:
second data indicative of the second geographic area;
third data indicative of a current distance from a current position of the first UT to a geometric center of the first geographic area;
fourth data indicative of a current distance from the current position of the first UT to a geometric center of the second geographic area;
fifth data indicative of a first predicted distance from a predicted position of the first UT at the first time to the geometric center of the first geographic area;
sixth data indicative of a second predicted distance from the predicted position of the first UT at the first time to the geometric center of the second geographic area;
seventh data indicative of a first received signal strength, at the first UT, of a first signal associated with the first geographic area; or
eighth data indicative of a second received signal strength, at the first UT, of a second signal associated with the second geographic area.

3. The system of claim 1, the first data comprising one or more of:
a first set of rank values, wherein each rank value of the first set of rank values is based on a distance, determined by the first UT, from the first UT to a point associated with a respective one of a set of geographic areas; or
a second set of rank values, wherein each rank value of the second set of rank values is based on a received signal strength, determined by the first UT, of a received signal associated with the respective one of the set of geographic areas.

4. The system of claim 1, wherein the first data is indicative of:
a first distance from a first position of the first UT to a first point within the first geographic area; and
a second distance from the first position of the first UT to a second point within the second geographic area; and
the first set of one or more processors executing instructions to:
determine the second geographic area based on the first distance being greater than the second distance.

5. The system of claim 1, wherein the first data is indicative of:
a first received signal strength, at the first UT, of a first signal associated with the first geographic area; and
a second received signal strength, at the first UT, of a second signal associated with the second geographic area; and
the first set of one or more processors executing instructions to:
determine the second geographic area based on the first received signal strength being less than the second received signal strength.

6. The system of claim 1, wherein the first data is indicative of:
a set of geographic areas that are adjacent to the first geographic area, wherein the set of geographic areas includes the second geographic area; and
one or more of:
a distance, determined by the first UT, from the first UT to a point associated with a respective one of the set of geographic areas; or
a received signal strength, determined by the first UT, of a received signal associated with the respective one of the set of geographic areas.

7. A method comprising:
determining state data associated with a first user terminal (UT), wherein the state data is associated with the first UT obtaining communication service using a first spot of a first satellite in a constellation of satellites;

determining, based on the state data, a handover request;
sending the handover request to the first satellite using the first spot;
receiving handover data from the first satellite using the first spot, wherein the handover data is indicative of a second spot and a handover time; and
based on the handover data, establishing communication with at least one satellite of the constellation of satellites using the second spot at the handover time.

8. The method of claim 7, further comprising:
determining, based on the state data, one or more of:
  a first set of rank values, wherein each rank value of the first set of rank values is based on a distance, determined by the first UT, from the first UT to a point associated with a respective one of a set of geographic areas; or
  a second set of rank values, wherein each rank value of the second set of rank values is based on a received signal strength, determined by the first UT, of a received signal associated with the respective one of the set of geographic areas; and
wherein the handover request comprises one or more of the first set of rank values or the second set of rank values.

9. The method of claim 7, further comprising:
determining a current position of the first UT;
determining that the current position of the first UT is within a first geographic area that is associated with the first spot;
determining, based on the state data, a predicted position of the first UT at or after the handover time; and
determining the handover request based on the predicted position being outside the first geographic area.

10. The method of claim 7, further comprising:
determining, using the first UT, a first received signal strength of a first signal associated with the first spot;
determining, using the first UT, a second received signal strength of a second signal associated with the second spot; and
determining the handover request based on the first received signal strength being less than the second received signal strength.

11. The method of claim 7, further comprising:
determining a set of spots, wherein each spot of the set of spots is provided by a single satellite;
determining, at the first UT, a set of received signal strengths, wherein each received signal strength, of the set of receive signal strengths, is associated with a respective spot of the set of spots, further wherein the set of spots includes the second spot; and
wherein the state data comprises the set of received signal strengths.

12. The method of claim 7, further comprising:
determining a set of spots comprising the second spot of a second satellite and a third spot of a third satellite; and
determining, at the first UT, a set of received signal strengths comprising a first received signal strength of the second spot and a third received signal strength of the third spot; and
wherein the state data comprises the set of received signal strengths.

13. The method of claim 7, further comprising:
determining the handover request based on the state data indicating one or more of:
  a position of the first UT; or
  a set of received signal strengths determined by the first UT, wherein each received signal strength, of the set of received signal strengths, is associated with a respective spot of a set of spots, further wherein the set of spots includes the second spot.

14. The method of claim 7, further comprising:
determining a set of spots that are adjacent to the first spot;
determining a destination spot based on one or more of:
  a position of the first UT; or
  a set of received signal strengths of signals received by the first UT, wherein each received signal strength is associated with a respective spot of the set of spots, further wherein the set of spots includes the second spot;
wherein the handover request comprises data indicative of the destination spot; and
wherein the second spot is the destination spot.

15. A system comprising:
a constellation of satellites comprising a first communication satellite; and
a first user terminal (UT) comprising:
  a navigation system;
  a first antenna;
  a first transmitter coupled to the first antenna;
  a first receiver coupled to the first antenna; and
  a first set of one or more processors executing instructions to:
    determine first data associated with the first UT, wherein the first data is associated with the first UT obtaining communication service using a first spot of the first communication satellite;
    determine, based on the first data, a handover request;
    send the handover request to the first communication satellite using the first spot;
    receive handover data from the first communication satellite using the first spot, wherein the handover data is indicative of a second spot and a handover time; and
    based on the handover data, establish communication with at least one satellite of the constellation of satellites using the second spot at the handover time.

16. The system of claim 15, the handover request comprising one or more of:
second data indicative of the second spot;
third data indicative of a current distance from a current position of the first UT indicated by the navigation system to a geometric center of the first spot;
fourth data indicative of a current distance from the current position of the first UT to a geometric center of the second spot;
fifth data indicative of a first predicted distance from a predicted position of the first UT at a first time to the geometric center of the first spot;
sixth data indicative of a second predicted distance from the predicted position of the first UT at the first time to the geometric center of the second spot;
seventh data indicative of a first received signal strength, at the first receiver, of a first signal associated with the first spot; or
eighth data indicative of a second received signal strength, at the first receiver, of a second signal associated with the second spot.

17. The system of claim 15, the first set of one or more processors executing instructions to:
determine a current position of the first UT based on output from the navigation system;

determine that the current position of the first UT is within a first geographic area that is associated with the first spot;

determine, based on the first data, a predicted position of the first UT at or after the handover time; and determine the handover request based on the predicted position being outside the first geographic area.

18. The system of claim 15, the first set of one or more processors executing instructions to:

determine, using the first receiver, a first received signal strength of a first signal associated with the first spot;

determine, using the first receiver, a second received signal strength of a second signal associated with the second spot; and determine the handover request based on the first received signal strength being less than the second received signal strength.

19. The system of claim 15, the first set of one or more processors executing instructions to:

determine the handover request based on the first data indicating one or more of:

a position of the first UT based at least in part on output from the navigation system; or a set of received signal strengths of signals received by the first receiver, wherein each received signal strength is associated with a respective spot of a set of spots, further wherein the set of spots includes the second spot.

20. The system of claim 15, the first set of one or more processors executing instructions to:

determine a set of spots that are adjacent to the first spot;

determine a destination spot based on one or more of:

a position of the first UT based at least in part on output from the navigation system; or a set of received signal strengths of signals received by the first receiver, wherein each received signal strength is associated with a respective spot of the set of spots, further wherein the set of spots includes the second spot;

wherein the handover request comprises data indicative of the destination spot; and wherein the second spot is the destination spot.

\* \* \* \* \*